United States Patent [19]
Savard

[11] Patent Number: 5,970,816
[45] Date of Patent: Oct. 26, 1999

[54] METHOD FOR SELECTING GEARS FOR A CYCLE WITH ADEQUATE CHAIN ALIGNMENT AND ASSOCIATED SELECTION DEVICE

[75] Inventor: Franck Savard, Planguenoual, France

[73] Assignee: Societe EGS, Chatellerault, France

[21] Appl. No.: 09/134,935

[22] Filed: Aug. 17, 1998

Related U.S. Application Data

[63] Continuation of application No. 08/598,998, Feb. 9, 1996, abandoned.

[30] Foreign Application Priority Data

Feb. 15, 1995 [FR] France .................................. 95 01816
Aug. 3, 1995 [EP] European Pat. Off. .............. 95450012

[51] Int. Cl.⁶ ................................................. G05G 11/00
[52] U.S. Cl. ............................................ 74/489; 74/502.2
[58] Field of Search .................................... 74/489, 337.5, 74/471 R, 475, 502.2, 567, 509, 331; 474/70, 80, 81

[56] References Cited

U.S. PATENT DOCUMENTS

| | | |
|---|---|---|
| 4,055,093 | 10/1977 | Ross . |
| 4,201,095 | 5/1980 | Cirami . |
| 4,267,744 | 5/1981 | Yamasaki . |
| 4,279,174 | 7/1981 | Ross . |
| 4,304,143 | 12/1981 | Nagano . |
| 4,412,828 | 11/1983 | Darby ........................................ 474/81 |
| 4,530,678 | 7/1985 | Wechsler . |
| 5,261,858 | 11/1993 | Browning . |
| 5,447,475 | 9/1995 | Socard . |
| 5,476,019 | 12/1995 | Cheever et al. . |
| 5,481,934 | 1/1996 | Tagawa . |
| 5,511,437 | 4/1996 | Braun . |
| 5,526,261 | 6/1996 | Kallis et al. . |

FOREIGN PATENT DOCUMENTS

| | | |
|---|---|---|
| 0 647 558 | 4/1995 | European Pat. Off. . |
| 274181 | 7/1927 | United Kingdom . |
| WO 91/15393 | 10/1991 | WIPO . |
| WO 95/03208 | 2/1995 | WIPO . |

Primary Examiner—Tamara L. Graysay
Assistant Examiner—David M. Fenstermacher
Attorney, Agent, or Firm—Young & Thompson

[57] ABSTRACT

A gear selection device, especially for a bicycle including a train of driving plates, a train of driven pinions connected by a chain, a gearshift associated with the plates and a gearshift associated with the pinions, a first cable for controlling the gearshift associated with the plates and a second cable for controlling the gearshift associated with the pinions, the gearshifts moving between two extreme positions and including elastic recall for moving from one of the extreme positions to the other, wherein the gear selection device includes a single rotary control handle with a fixed portion forming a pan for linking with the cycle and equipped with a barrel integral with the handle and including two tracks for receiving pins fixed to the ends of the first and second control cables, the tracks having profiles to ensure a positioning with a sufficient tolerance to exaggerate the movement and accurate return of the cables corresponding to the plate/pinion pairings of the selected successive gears, as well as an indexing mechanism for each of these gears, as well as a gear selection method.

7 Claims, 15 Drawing Sheets

| plate \ pinion | 1=30d | 2=24d | 3=20d | 4=17d | 5=15d | 6=13d |
|---|---|---|---|---|---|---|
| A=28d | 0,933 / 7Km/h | 1,167 / 8,8Km/h | 1,400 / 10,5Km/h | 1,647 / 12,4Km/h | 1,867 / 14,0Km/h | 2,154 / 16,2Km/h |
| B=38d | 1,267 / 9,5Km/h | 1,583 / 11,9Km/h | 1,900 / 14,3Km/h | 2,235 / 16,8Km/h | 2,533 / 19,0Km/h | 2,923 / 21,9Km/h |
| C=48d | 1,600 / 12Km/h | 2,000 / 15Km/h | 2,400 / 18Km/h | 2,824 / 21,2Km/h | 3,200 / 24Km/h | 3,692 / 27,7Km/h |

| plate \ pinion | 1=30d | 2=24d | 3=20d | 4=17d | 5=15d | 6=13d |
|---|---|---|---|---|---|---|
| A=28d | [1] 0,933 / 7Km/h | [2] 1,167 / 8,8Km/h | [3] 1,400 / 10,5Km/h | 1,647 / 12,4Km/h | 1,867 / 14,0Km/h | 2,154 / 16,2Km/h |
| B=38d | 1,267 / 9,5Km/h | [4] 1,583 / 11,9Km/h | [5] 1,900 / 14,3Km/h | [6] 2,235 / 16,8Km/h | [7] 2,533 / 19,0Km/h | 2,923 / 21,9Km/h |
| C=48d | 1,600 / 12Km/h | 2,000 / 15Km/h | 2,400 / 18Km/h | [8] 2,824 / 21,2Km/h | [9] 3,200 / 24Km/h | [10] 3,692 / 27,7Km/h |

| plate \ pinion | 1=34d | 2=29d | 3=24d | 4=20d | 5=17d | 6=15d | 7=13d |
|---|---|---|---|---|---|---|---|
| A=28d | 0,824 8,5Km/h | 0,966 7,2Km/h | 1,167 8,8Km/h | 1,400 10,5Km/h | 1,647 12,4Km/h | 1,867 14,0Km/h | 2,154 16,2Km/h |
| B=38d | 1,118 8,4Km/h | 1,310 9,8Km/h | 1,583 11,9Km/h | 1,900 14,3Km/h | 2,235 16,8Km/h | 2,533 19,0Km/h | 2,923 21,9Km/h |
| C=48d | 1,412 10,6Km/h | 1,655 12,4Km/h | 2,000 15Km/h | 2,400 18Km/h | 2,824 21,2Km/h | 3,200 24Km/h | 3,692 27,7Km/h |

| plate \ pinion | 1=34d | 2=29d | 3=24d | 4=20d | 5=17d | 6=15d | 7=13d |
|---|---|---|---|---|---|---|---|
| A=28d | ①0,824 8,5Km/h | ②0,966 7,2Km/h | ③1,167 8,8Km/h | ④1,400 10,5Km/h | 1,647 12,4Km/h | 1,867 14,0Km/h | 2,154 16,2Km/h |
| B=38d | 1,118 8,4Km/h | 1,310 9,8Km/h | ⑤1,583 11,9Km/h | ⑥1,900 14,3Km/h | ⑦2,235 16,8Km/h | 2,533 19,0Km/h | 2,923 21,9Km/h |
| C=48d | 1,412 10,6Km/h | 1,655 12,4Km/h | 2,000 15Km/h | ⑧2,400 18Km/h | ⑨2,824 21,2Km/h | ⑩3,200 24Km/h | ⑪3,692 27,7Km/h |

FIG. 1C

| pinion / plate | 1=34d | 2=29d | 3=24d | 4=20d | 5=17d | 6=15d | 7=13d | 8=12d |
|---|---|---|---|---|---|---|---|---|
| A=28d | 0,824<br>6,5Km/h | 0,966<br>7,2Km/h | 1,167<br>8,8Km/h | 1,400<br>10,5Km/h | 1,647<br>12,4Km/h | 1,867<br>14,0Km/h | 2,154<br>16,2Km/h | 2,333<br>17,5Km/h |
| B=38d | 1,118<br>8,4Km/h | 1,310<br>9,8Km/h | 1,583<br>11,9Km/h | 1,900<br>14,3Km/h | 2,235<br>16,8Km/h | 2,533<br>19,0Km/h | 2,923<br>21,9Km/h | 3,167<br>23,8Km/h |
| C=48d | 1,412<br>10,6Km/h | 1,655<br>12,4Km/h | 2,000<br>15Km/h | 2,400<br>18Km/h | 2,824<br>21,2Km/h | 3,200<br>24Km/h | 3,692<br>27,7Km/h | 4,000<br>30,0Km/h |

FIG. 2C

| pinion / plate | 1=34d | 2=29d | 3=24d | 4=20d | 5=17d | 6=15d | 7=13d | 8=12d |
|---|---|---|---|---|---|---|---|---|
| A=28d | ①0,824<br>6,5Km/h | ②0,966<br>7,2Km/h | ③1,167<br>8,8Km/h | ④1,400<br>10,5Km/h | 1,647<br>12,4Km/h | 1,867<br>14,0Km/h | 2,154<br>16,2Km/h | 2,333<br>17,5Km/h |
| B=38d | 1,118<br>8,4Km/h | 1,310<br>9,8Km/h | ⑤1,583<br>11,0Km/h | ⑥1,900<br>14,3Km/h | ⑦2,235<br>16,8Km/h | ⑧2,533<br>19,0Km/h | 2,923<br>21,9Km/h | 3,167<br>23,8Km/h |
| C=48d | 1,412<br>10,6Km/h | 1,655<br>12,4Km/h | 2,000<br>15Km/h | 2,400<br>18Km/h | ⑨2,824<br>21,2Km/h | ⑩3,200<br>24Km/h | ⑪3,692<br>27,7Km/h | ⑫4,000<br>30,0Km/h |

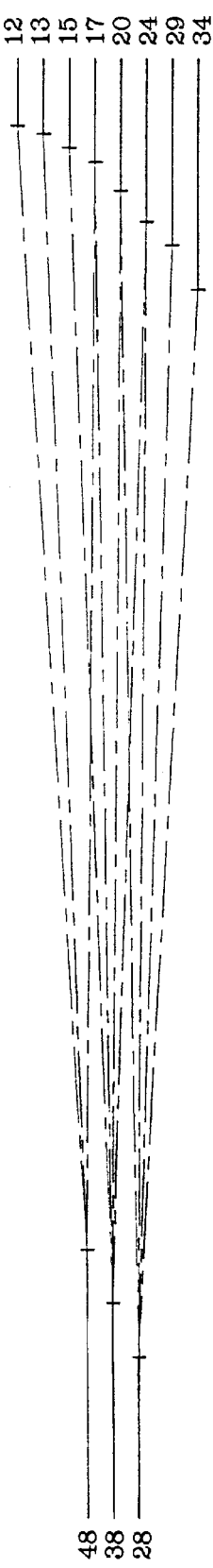

FIG. 3C

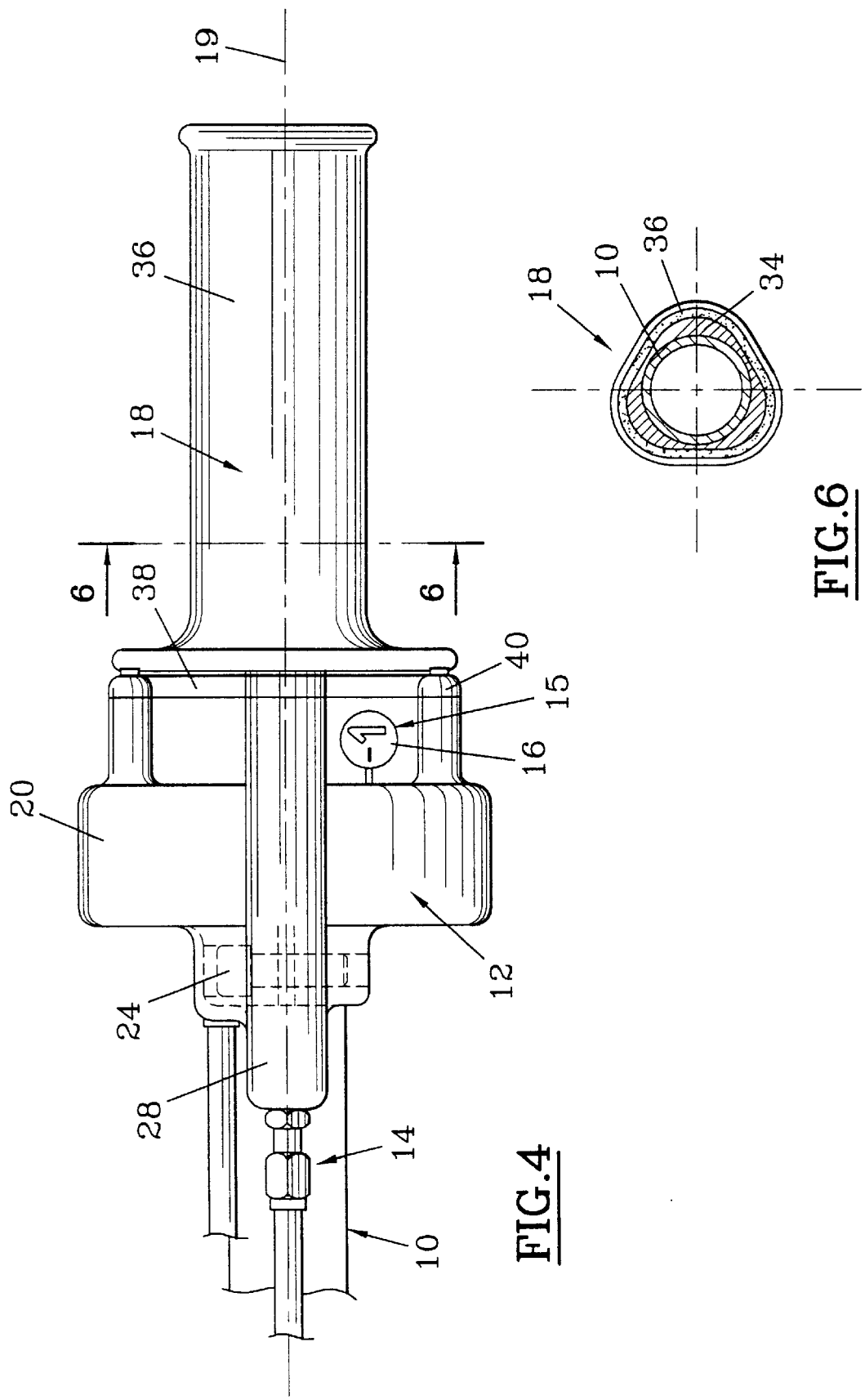

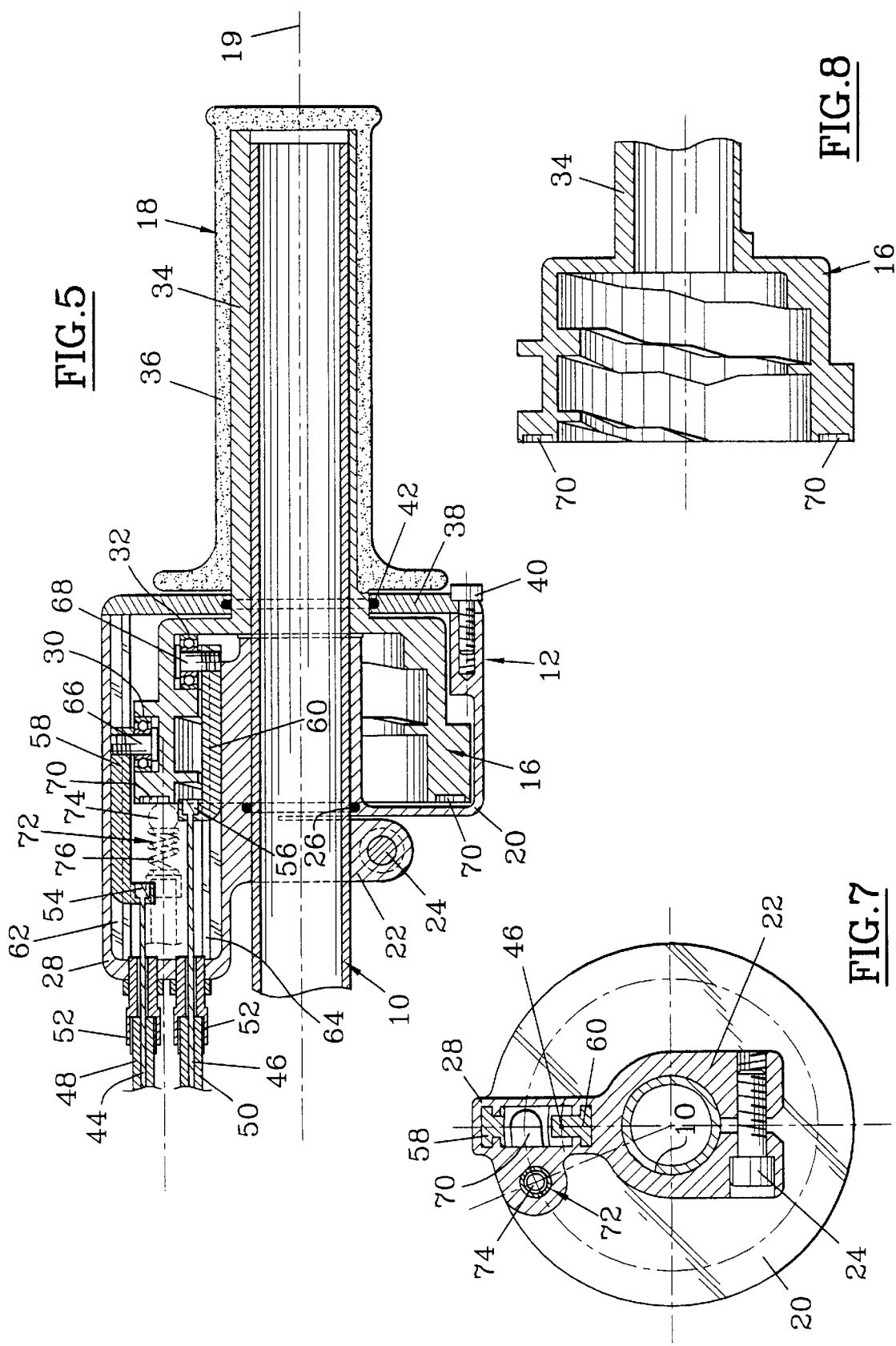

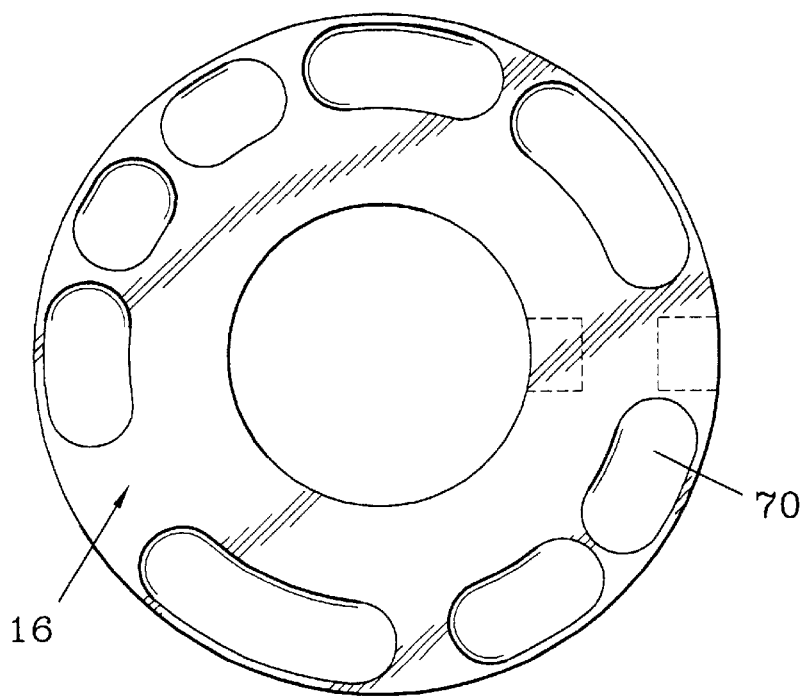
FIG.10
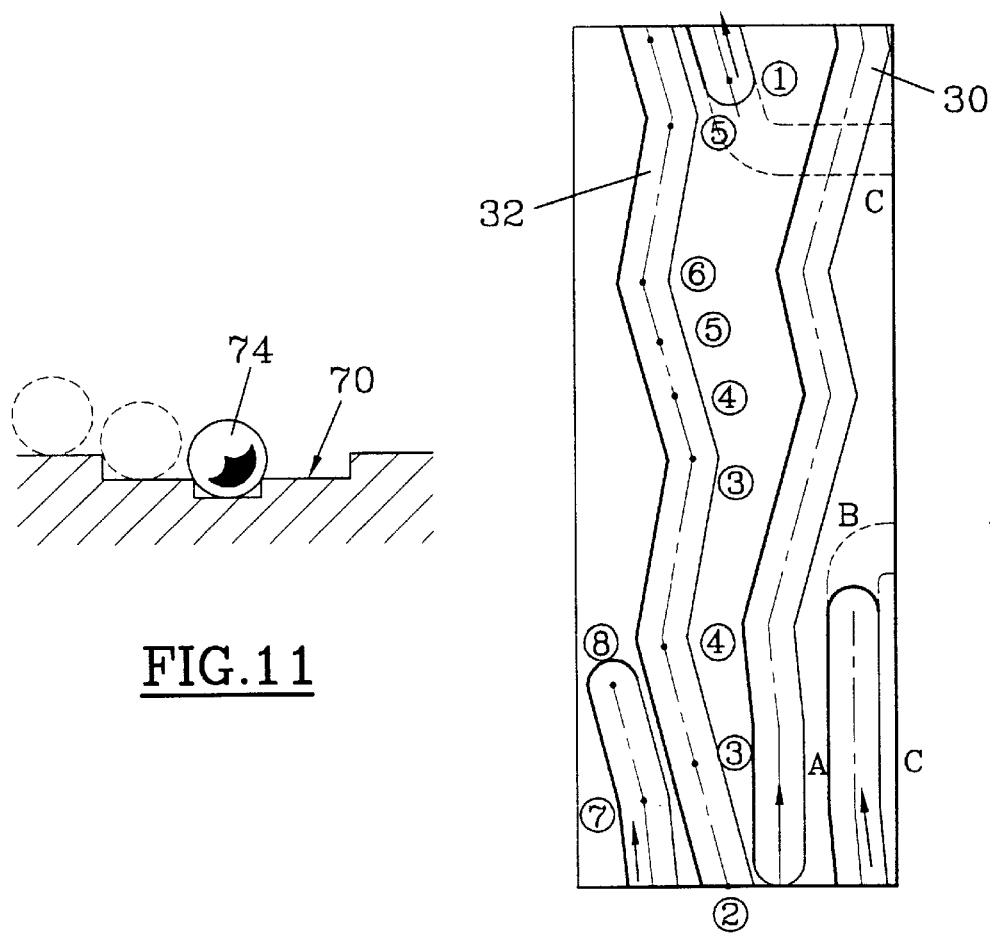
FIG.11
FIG.9

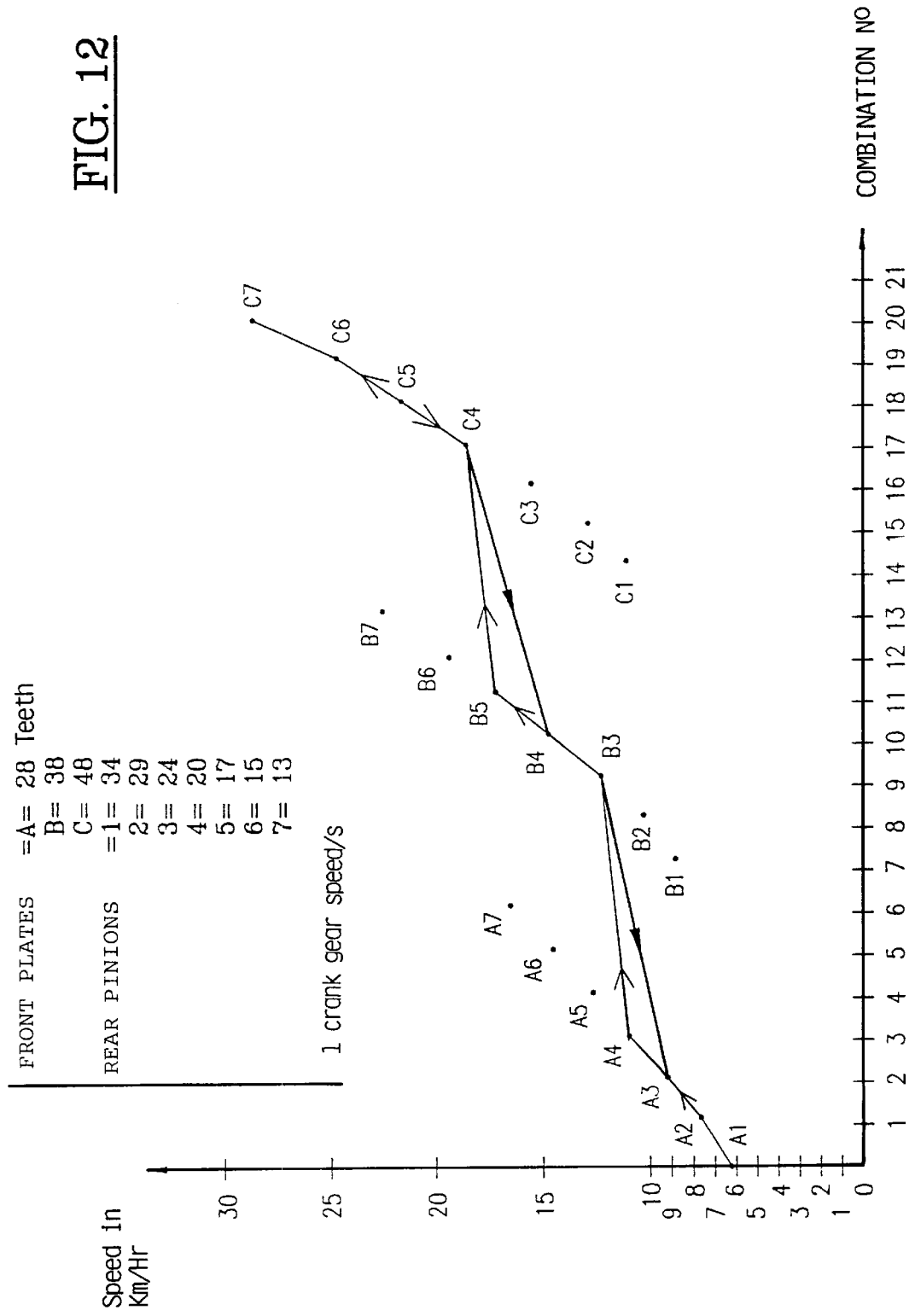

METHOD FOR SELECTING GEARS FOR A CYCLE WITH ADEQUATE CHAIN ALIGNMENT AND ASSOCIATED SELECTION DEVICE

CROSS-REFERENCE TO RELATED APPLICATIONS

This application is a continuation of application Ser. No. 08/598,998, file Feb. 9, 1996 now abandoned.

BACKGROUND OF THE INVENTION

1. Field of the Invention

The present invention relates to a method for selecting gears and a gear selection device for vehicles including a first driving shaft equipped with at least two plates and a second driven shaft equipped with at least two pinions, especially for bicycles.

2. Background Information

An application of the gear variation device for a bicycle is now described. This gear selection device is of special interest for bicycles as described hereafter but it may be adapted to a large number of transmissions.

In the case of bicycles, the crank gear is equipped on its driving shaft with plates having different outer diameters and thus numbers of different teeth in ratios given according to the applications. For the purpose of simplification, a crank gear is selected with two plates or sprocket wheels A and B, the plate B having a number of teeth greater than that of the plate A and thus a larger diameter. The plate A is lower, that is, on the side of the frame and the plate is external, that is, furthest from the frame.

For each crank gear rotation, it is possible to increase the gear by moving from the plate A to the plate B.

The force to be provided increases as the crank arm difference between the distance from the pedal, where the force is exerted, to the periphery of the plate bearing the teeth, reduces.

The rear main wheel is integral, generally with the insertion of a free wheel, with a driven shaft equipped with pinions roughly aligned with the plates having different diameters and thus different numbers of teeth in ratios given according to the applications and in particular calculated according to the plates so as to obtain the desired results concerning actuation of the wheel.

In fact, the more the diameter and thus the more the number of teeth is reduced, the more is the number of wheel rotations for a given plate. The distance covered by the bicycle increases when the diameter and number of teeth reduce, which is the opposite effect with the plates.

On the other hand, the force to be supplied is much greater with a small pinion as the crank arm in question of the periphery of the pinion at the wheel spin axis reduces.

The largest gear corresponding to the largest plate and the smallest pinion needs the largest force and the smallest gear corresponding to the smallest plate and the largest pinion needs the weakest force from the user.

For the continuation of the explanations in the preamble, it is considered that the second driven shaft is also equipped with only two pinions 1 and 2, the pinion having a diameter and a number of teeth greater than those of the pinion 2.

Traditionally, there is a single chain between the plates and pinions, front gearshift means able to move the chain from one plate to another plate and rear gearshift means able to move the chain from one pinion to the other pinion.

Advantageously and traditionally, the plate 1 with the smallest diameter and the pinion 1 with the largest diameter is also internal. This has the effect of having a chain almost parallel to the traction direction for the smallest gear A/1 requiring the weakest force and for the largest gear B/2 requiring the strongest force, as explained earlier.

The two intermediate gears A/2 and B/1 are selected so that A/2 is smaller than B/1.

It is also necessary to mention that for these two intermediate gears, there is moreover a loss due to the fact that the traction of the chain is out of alignment.

Most of the systems of the prior art propose front gearshift means maneuvered by a plate control, and rear gearshift means maneuvered by a pinion control, these two controls being independent of each other.

Known gearshift means have the same design (ductile parallelogram), namely for the front a chain guide forming a yoke which moves along an axis approximately parallel to the axis of the crank gear which pushes the chain onto its taut strand provoking a controlled gear shift, and for the rear at least one small wheel moving laterally which pushes the chain into its slack strand.

The controls are of different types and many improvements have been made, especially to facilitate selection maneuvering.

The latest control, known in the trade as GRIP SHIFT makes it possible, by means of a rotary left handle and a rotary right handle, to conventionally and individually control the gearshift means of the plates and pinions respectively.

The advantage for the user is to change "speed" by maneuvering the handles and thus the chain between the various plates and pinions without letting go of the handlebar too much, which is a considerable advantage.

Nevertheless, as all users have been able to see, the physical effort required to "control" a cycle equipped with several plates and pinions is far from easy.

First of all, it is essential to assimilate the inversion of the forces between the plates and the pinions. The more the diameter of the plate increases, the more the speed increases for an identical pedalling rate, and conversely the more the diameter of the pinion increases, the more the speed reduces, again for an identical pedalling rate.

Furthermore, controls by conventional levers and rotating handles, such as the GRIP SHIFT control, are rotational and it is necessary to make the relation between the directions of rotation of the movements of these controls and the effects obtained.

It is to be noted that the losses due to the misalignment of the chain quickly become appreciable, without counting all the subsequent disagreeable effects this involves, especially noise, vibrations and ill-timed gear shifts.

Of course, these effects are even more noticeable by the user who rides occasionally. Nevertheless, competing riders are also highly affected by these effects. The cycles used are extremely sophisticated and certain cycles, such as cross-country bicycles, may include up to three plates and eight pinions, namely 24 combinations. The competing rider is then subjected during a competition to wasteful mental gymnastics seeking to select the correct plate/pinion pairing and a better alignment of the chain instead of being solely preoccupied with the course, his opponents in the race and being concerned with his race tactics. Moreover, the chain is particularly long and the rear gearshift means, the chain adjuster, have a particularly long and vulnerable yoke so as to be able to satisfy the significant free chain length variations.

Selection problems arise, especially when it is essential to quickly consider extremely different plate/pinion pairing solutions, especially when the competitor arrives at the foot of a steep incline following a rolling portion of the course, or conversely after moving from a high point when the course had a precipitous downhill incline.

Usually, these choices are not fully adapted and a bad change requires correction with at least one additional gear shift, which constitutes a loss of time, energy, and concentration which happens to even the most experienced riders.

During a car race, a maximum of six speeds is provided and numerous driving aids facilitate the various movements to enable the driver to concentrate on the race track, the approach speeds and brakings. Thus, one can readily understand the advantage of being able to simplify the approach commonly known as "change of speeds", which for bicycles is in fact a change of plates and gears.

Another specific category concerns children who also ought to benefit from a simpler mechanism so as to be able to use the benefits of gearshift means. This could increase sales and the use of a bicycle, especially with the youngest riders.

Undoubtedly, it is essential to carry out an analysis on the basis of the various choices concerning multiple combination systems, and FIGS. 1A, 1B and 1C show three tables in which the gears are indicated, as well as the displacement speeds obtained for a wheel, diameter 0.665 m, at the rate of 1 crank gear revolution per second.

Table 1A corresponds to a disposition of 3 plates and 6 pinions.

Table 1B corresponds to a disposition of 3 plates and 7 pinions.

Table 1C corresponds to a disposition of 3 plates and 8 pinions.

It shall be observed first of all that some combinations give identical or almost identical gears and thus identical or almost identical speeds, for example:

Table 1A: A4/B2 or A5/B3 or A4/C1

Table 1B: A5/C2 or A6/B4 or A7/B5

Table 1C: A4/C1 or B7/C5 or B8/C6

This clearly shows that there are identical or almost identical gears for a given item of equipment and, thus, result in redundancies.

The interest of the user, from child to competitive rider, is to make use solely of relevant gears by rejecting gears which are too similar and those which are useless, even idle gears, while retaining the best chain alignment.

It is further also essential, especially for a competitive rider, to authorize a multiple selection concerning small gears when the course has a large number of steep undulations or a multiple choice concerning large gears if the course is smooth, or even with a first set of choices concerning large gears and a second set of choices concerning small gears without any intermediate gear for long up and down climbs.

Also, from about twenty of the possible plate/pinion combinations, it is essential to retain about ten combinations with gears being progressively selected so as to cover all user requirements, these selected gears being the only ones observing a good chain alignment.

The invention therefore concerns a method for selecting progressive gear ratios from a set of gears provided by a pinion/plate pairing, as well as a device for selecting the associated gears.

To this effect, the invention concerns a method for selecting the gears of a transmission, especially of a bicycle including a train of driving plates and a train of driven pinions connected by a chain, wherein a set of plate/pinion pairs is selected having increasing or decreasing gear ratio from the set of possible plate/pinion combinations, thus suppressing the redundant ones.

It is preferable to select gears regularly stepped between the smallest gear ratio and the largest gear ratio or grouped gears according to the slopes, user and the terrain.

Again, from a double-entry table including pinions in lines and plates in columns or conversely, it is preferable to select a set of pairings per passage of one gear to the next one or preceding one by moving from one box of the table to the adjacent line box, adjacent column box or even diagonally to the adjacent box.

As regards the device, WO 91/15393 discloses a device intended to simultaneously control the front gearshift means of the plates and the rear gearshift means of the pinions so as to retain the best possible alignment of the chain between the plates and the pinions.

Also, the device is able to change the plate as soon as the chain falls or rises on the pinions so as to keep the correct alignment.

With this aim in mind, a fixed part is secured to the frame of the bicycle with a first translation immobile spin axis and bearing a stop in the form of a freely rotating roller. A casing is mounted sliding on the fixed part.

The following are provided integral with the casing:

- a cam in support on the roller and driven in rotation by a set of gear reduction pinions, the movements being controlled by independent traction cables with one working in one direction and the other in an opposing direction.
- a cylinder for winding/unwinding the two control cables of the front gearshift means and the rear gearshift means.

The cam has a profile so that its radius increases every 90° by a constant value. Holes on the surface of the cam receive balls pressed by springs so as to provide a hard point on each rotation of 90°.

Functioning is thus made upon rotations of the cam, the casing moves further away or moves closer by sliding on the fixed part which ensures the traction or drawing closer of the cables at the same time as any winding of these cables with the result that via the combined addition or removal of these movements, it is possible to control the movement of the front and rear gearshift means according to a fully fixed pre-established combination.

In fact, it shall be observed that the cam needs to make a complete turn on each occasion. So as to restart a new cycle, for example if the cam has a division into four sectors of 90°, it is possible to carry out combinations of:

1 to 4 pinions with the first plate, strictly 4 pinions with the second plate, 1 to 4 pinions with the third plate.

In fact, it is strictly essential to make the cam rotate by 360° for the intermediate plate, which limits the choice of plate/pinion combinations.

Thus, it is not possible to select the gears but only allows a possibility of continuously retaining a good alignment of the chain.

Also, a case able to move on a fixed part on the frame is not adapted to bicycles and even less so to the cross-country bicycle sector, as mud, water, leaves and/or dust could impede the proper functioning of this casing.

Moreover, it is essential to have two cables for controlling the casing and cables for controlling the gearshift means as it is still vital to exert a traction to maneuver the casing in either direction as a recall element of reasonable size would be sufficient and in all cases would render the control even more difficult for the user to handle.

The rigidity of the device as described is evident at the moment of directly changing from the smallest diameter of the cam to the largest diameter. In fact, as regards the first direction of rotation, the elongation of the diameter is effected gradually by increasing from a constant value but in the opposite direction and there is an extremely hard passage point of 3 values.

It is also to be noted that the pinions and spindles are fragile and there is a large amount of friction. In this respect, it is to be noted that the device can only function with adjustment members (not described), but which would render the device even more delicate, both as regards mechanical resistance and adjustments and maintenance.

Reliability is naturally reduced by the significant number of mobile parts used, which also increases the cost of producing such a device.

A variant of this device is able to control a mobile casing by an endless screw driving an internally threaded cam so as to cooperate with said screw and fitted on its outer surface with throats for guiding the control cable heads of the front and rear gearshift means.

This variant is able to dispense with intermediate control cables but with one major drawback: the user has to rotate the handle by more than one turn up to three turns, which is not foreseeable in practice.

The problem of carrying out at least one complete turn during the cycle still exits, which limits the choice of combinations.

The device also prohibits any shunt of a set of combinations to revert much quicker to a given plate/pinion combination. The user must then move through all the combinations of speeds on climbing and going downhill.

In all cases, it is possible to quickly modify the pre-established combinations, which is moreover pointless in the device of this document since the only aim is to eliminate the combinations during use when the chain is not aligned, or for a pre-established choice of plates and pinions, the correct alignments and tolerances are fully known.

WO 95/03208 also describes a modified front gearshift means.

In fact, a gear shift is still effected by elastic recall means in the direction of the largest pinion or plate towards the smallest and by a manual maneuver carried out by the user in the opposite direction as the force required is greater.

Moreover, the diameter of the plates shall increase from inside to outside and conversely for the pinions so that the smallest gear and the largest gear have the best possible chain alignment.

In WO 95/03208, the elastic recall means seek to move the control yoke of the smallest plate towards the largest one. In this case, the two springs of the front and rear gearshift means work in the same direction from inside to outside.

It is to be noted that the recall spring needs to be extremely powerful as it is necessary on the plate with the largest diameter to bring the chain above the teeth so that it is then positioned on the teeth. Also, in addition to the forces to press the chain in lateral translation, that is onto the taut strand, it is necessary to bring the chain to a diameter larger than the diameter of the largest plate.

This results in an extremely difficult maneuver at the control member which requires that the user expend a large effort.

This considerable force is constant completely along the kinematics chain and all the other members accordingly need to be dimensioned, especially the cam, guiding snug and lever.

It is to be noted that the snug integral with the lever in support on the cam is pressed by the cable and by the recall force of the recall means of the gearshift means, but there is no possibility of pulling on the cable and pushing as proposed by the present invention.

In addition, if the plate/pinion pairings are taken into account, the chain alignment is not an observed parameter. Table II of FIG. 8 of WO 95/03208 shows a combination of the plate B with the smallest pinion, which is not a desirable combination.

SUMMARY OF THE INVENTION

The aim of the device of the present invention, including its variants, is to be able to use a gear selection, with simple reliable means which ensure easy moves from one combination to another which authorize sudden variations in the direction of the reduction of the gears with extremely gradual variations in the direction of increasing the gears for example, while optimizing the chain alignments. The present device even permits an extremely quick modification of the choice of the combinations according to the circuit.

A further aim is to offer a maneuver member which is flexible for a user, knowing that children in particular find it hard to exert considerable forces while retaining their balance without stepping aside. It is also useful to provide an angularly limited rotation so as to cover the range of the gears retained.

The device needs to remain simple with a highly restricted number of parts which, apart from the measure of reliability mentioned, proves to be advantageous in terms of cost for industrial applications.

After a reading of the following detailed description, it shall be observed that the device may be integrated on first making the bicycle, but can be adapted on all bicycles equipped with front and rear gearshift means which enables it to be installed subsequently on existing bicycles.

The invention also concerns a device for selecting gears using the method of the invention, especially for a cycle including a train of driving plates, a train of driven pinions connected by a chain, gearshift means associated with the plates and gearshift means associated with the pinions, a first cable for controlling the gearshift means associated with the plates and a second cable for controlling the gearshift means associated with the pinions, said gearshift means moving between two extreme positions and including elastic recall means from one of the extreme positions to the other, wherein it includes a single rotary control handle with a pan-shaped fixed portion for forming a link with the bicycle and equipped with a barrel rendered integral with the handle and including two tracks for receiving pins fixed to the ends of the first and second control cables, said tracks having profiles to ensure a positioning of the cables corresponding to the plate/pinion pairings of the selected successive gears, as well as indexing means for each of these gears.

According to one embodiment of the invention, the barrel is cylindrical with the shape of a bell and the tracks are recessed disposed inside and outside said bell, and each pin is a roller rolling in the corresponding track integral with a translation-guided cursor fixed at the end of the corresponding control cable.

The barrel more particularly includes a disk with bosses and the pins are rollers situated on the fingers provided to roll on said bosses, the fingers enabling the rotary movement to be converted into an approximately linear movement.

The device of the invention includes means for compensating the forces of the elastic recall means of the gearshift means associated with the plates and the pinions.

These compensation means include for each control cable a spring coaxial with said control cable and precompressed and inserted between a fixed stop of the control handle and the corresponding pin.

The springs are large helical springs with a small diameter and slight rigidity so as to provide a sufficient compensation force for a minimum spatial requirement.

The device of the invention includes double directional ratchet means inserted between the rotary control handle and the barrel, each ratchet including a pawl articulated with respect to a bell-shaped elongation of the control handle recalled projecting by a spring, said pawl being provided to cooperate with notches fitted in the barrel.

According to the device of the present invention, the fixed portion of the control handle, forming a pan, includes means to authorize the removal of a first barrel and the placing of a second barrel bearing different tracks.

According to one variant, each track is split into segments with means for adjusting the projecting of each segment so as to embody a track with an adjustable profile.

The method and device of the invention are now to be described in detail in the following description, as well as the associated variants, these embodiments being in no way restrictive with all the variants making use of technical equivalents included in the present application.

BRIEF DESCRIPTION OF THE DRAWINGS

FIGS. 1A, 1B and 1C are tables of gears and displacement speeds obtained for 18, 21, 24 plate to pinion combinations.

FIGS. 3A, 3B and 3C represent the positions of the chain in the case of FIGS. 2A, 2B and 2C, FIG. 4 represents a top view of a handle conforming to the invention with the device integrated in a cycle handle, FIG. 5 represents a longitudinal cutaway view of the handle of FIG. 4, FIG. 6 represents a cutaway view along the line 6—6 of FIG. 4, FIG. 7 represents a cutaway view along the line 7—7 of FIG. 5, FIG. 8 represents a view of the isolated barrel, FIG. 9 represents a spread out view of the tracks of the barrel, FIG. 10 represents a view of the selection lights, FIG. 11 is an isolated cutaway view of an elongated slot, FIG. 12 represents a 4-3-4 shift pattern with a return shunt with the aid of a shunting.

DESCRIPTION OF THE PREFERRED EMBODIMENTS

Figures 1A, 2A, 3A:

In FIG. 1A, the gears obtained have been calculated with a wheel having a diameter of 0.665 m when the user pedals at the rate of 1 crank gear revolution per second.

The pinion of column 1 of FIG. 1A includes 30 teeth.

The pinion of column 2 of FIG. 1A includes 24 teeth, and so on.

The plates A, B and C include 28, 38 and 48 teeth.

The smallest gear A1 corresponds to a speed of 7 km/hr which is the best gear reduction ratio and is retained for the first combination of the selection according to the method.

Without changing the plate, the second combination is A2 and the third combination is A3.

It is then possible to select A4 or B2 which has a difference of 0.5 km/hr.

In the embodiment shown, B2 has been retained which results in a change of plate and an upward movement of a pinion so as to obtain the fourth retained combination B2.

The fifth, sixth and seventh combinations retained are B3, B4 and B5 so as to avoid changing any plate which, for ratios approximately equivalent to C2, C3 and C4, makes it possible to work with a better chain alignment.

The eighth combination, after a change of plate and pinion, is C4, the ninth and tenth combinations being C5 and C6.

These combinations are shown in FIG. 2A, whereas the various positions of the chain are visible in FIG. 3A.

It would have been also possible to move directly from B4 to C4 and then C5 and C6, that is a simple change of plate from B to C without changing any pinion, obtaining 9 combinations instead of 10, the increment in the large gears being much larger.

Figures 1B, 2B, 3B:
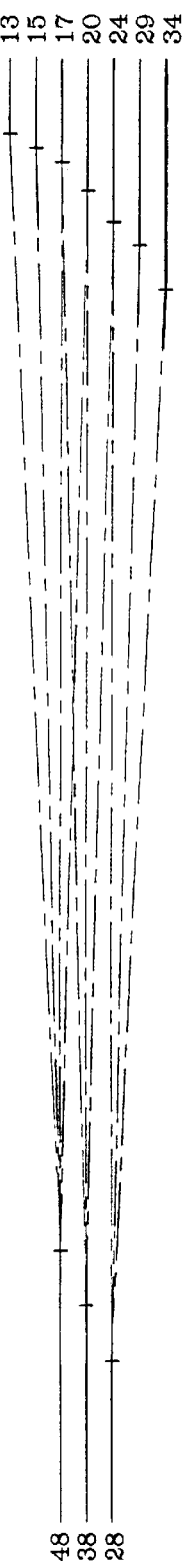

On a slightly more uneven course, the climbs are steeper and small gears are needed, whereas going downhill requires large gears so as to be able to pedal going down and remain in gear. In this case, the configuration of FIG. 2B is selected, the train of pinions generally including an additional pinion with 34 teeth.

Table 1B shows the various gears with combinations resulting in a 4-3-4 shift pattern.

On the basis of the same train of plates and pinions, it would be possible to embody a combination A1, A2, A3; B2, B3, B4, B5, B6; C5, C6, C7 which involves a 3-5-3 shift pattern.

Figure 2A:
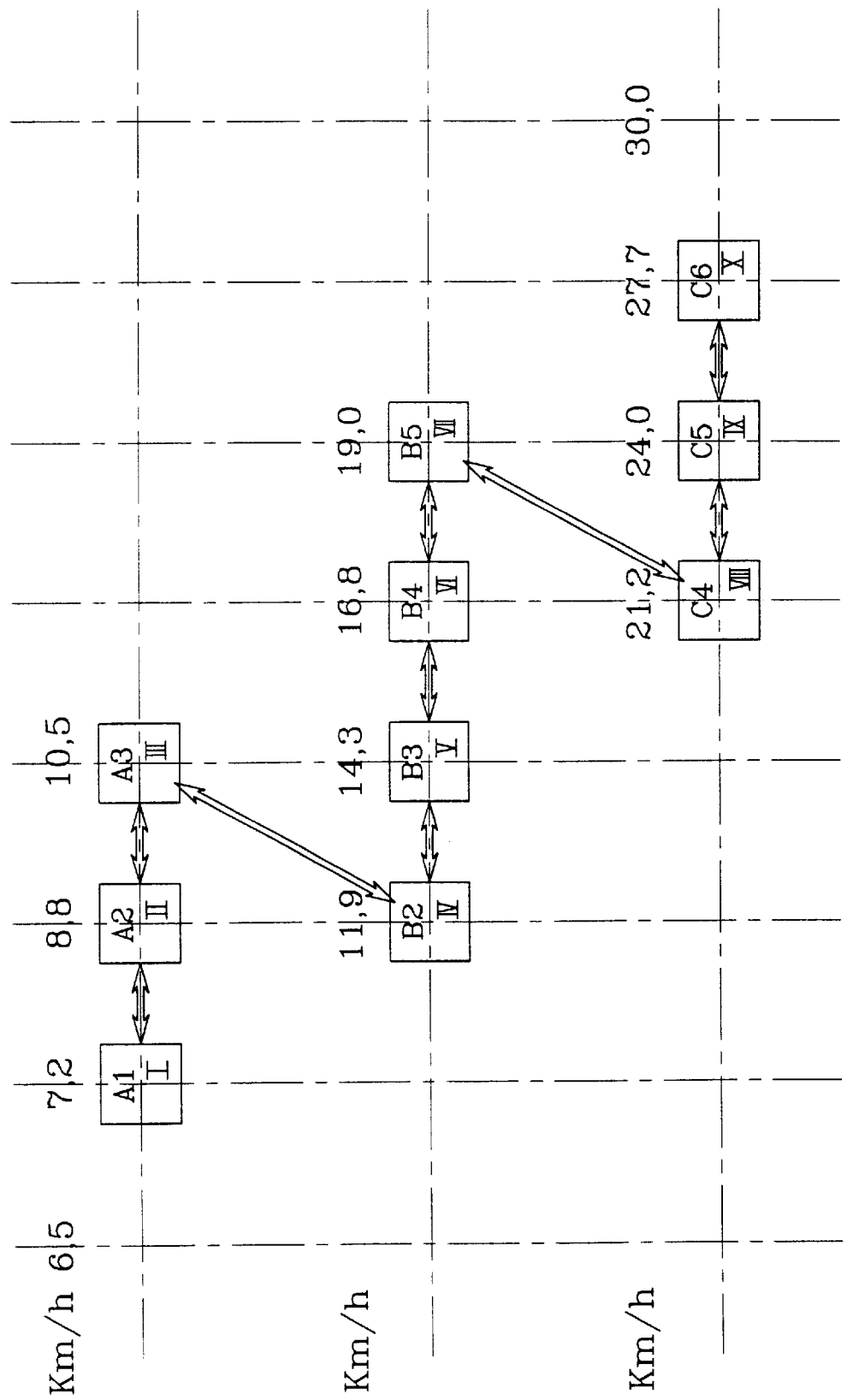
FIGS. 2A, 2B and 2C represent the choices retained, FIGS. 2A', 2B' and 2C' represent comparative choices.
Figure 2B:
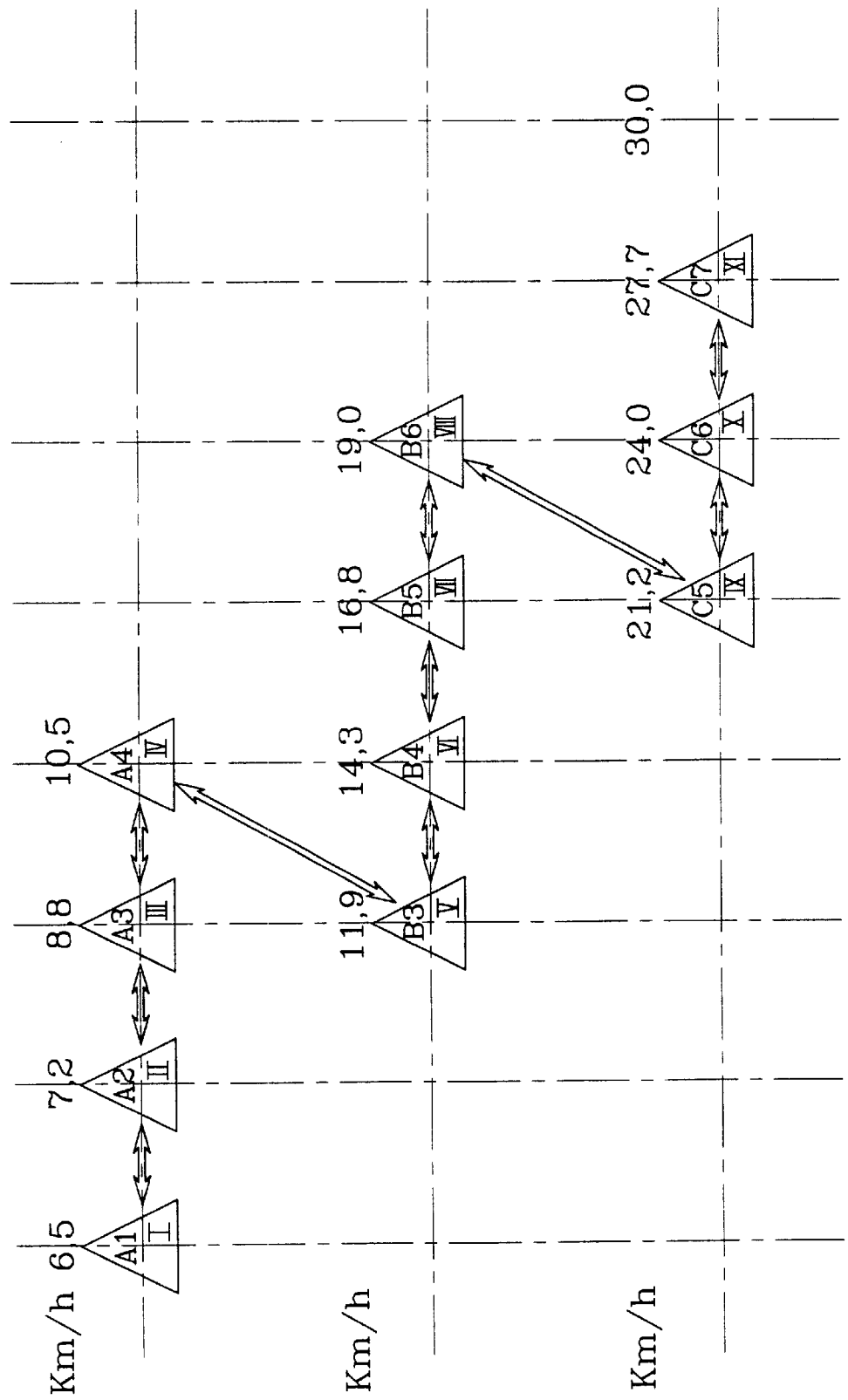
Figure 2C:
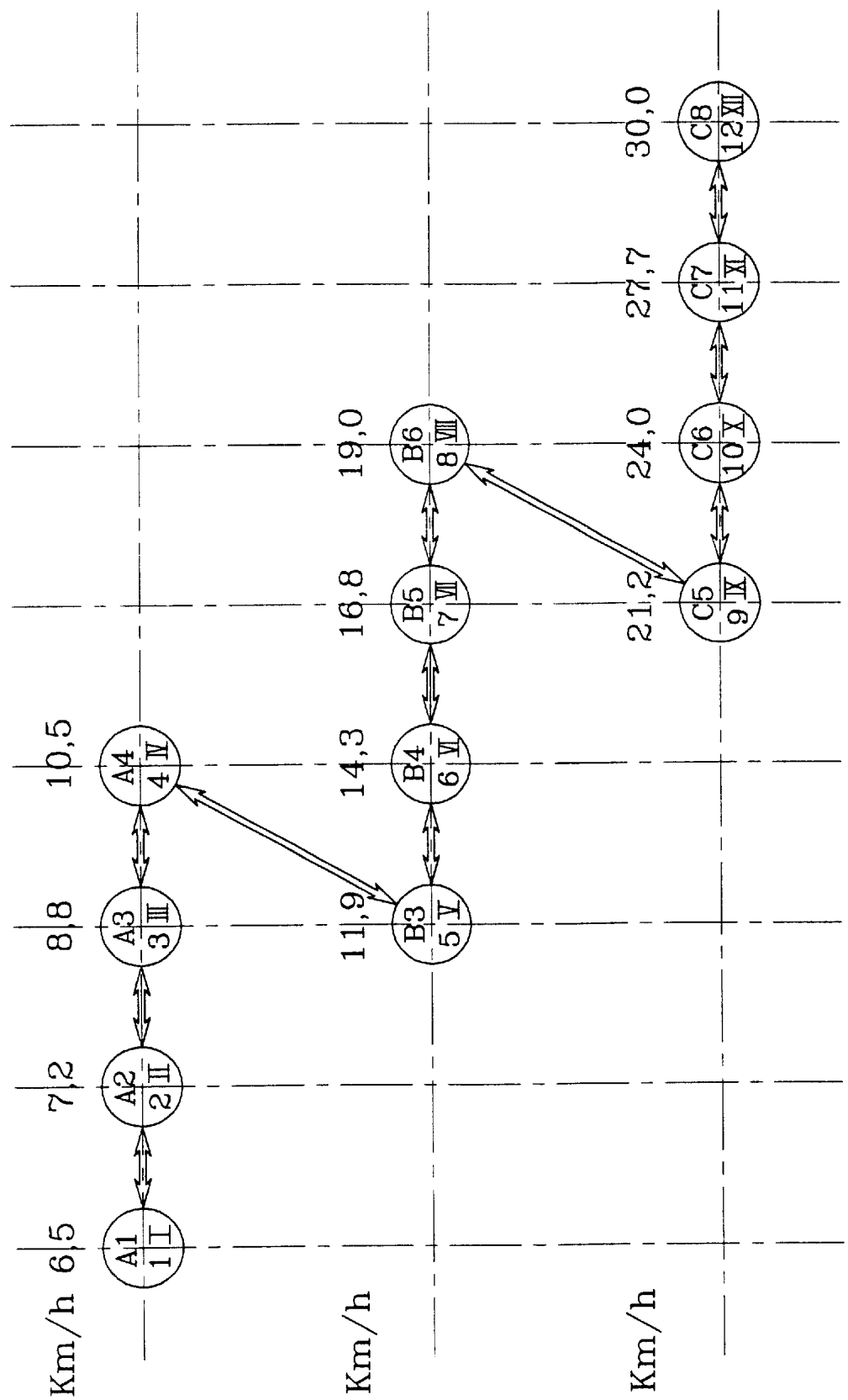

On a more uneven course, the train of pinions is completed by a small pinion with 12 teeth and, as shown on FIG. 2C, a 4-4-4 shift pattern is obtained with high progressivity and an observed proper alignment.

It shall be observed that the method of the invention only includes combinations of increasing or decreasing gears, depending upon the desired direction.

Thus, in one direction, there is an "acceleration" and in the opposite direction "deceleration".

It is possible to speak of an optimized efficiency gear selection and no longer "change of speed", as the plate and pinion jumps are currently called.

The user does not have to worry about the plate/pinion combination and the redundancies currently obtained by pointless combinations and does not have to worry about checking good chain alignment.

The choice of gears may be standardized, as shown on FIGS. 2A', 2B' and 2C'. These figures show that, depending on the equipment of bicycles, it is possible to obtain identical selections but in a number which is that much greater when the cycle is equipped with pinions.

Thus, for the selection 2B', a combination is added as regards the small gears so as to use the additional pinion with 34 teeth.

For the selection 2C', a combination is added concerning the large gears in addition to that of 2B' for the small gears so as to use the additional pinion with 12 teeth.

The method of the invention consists of drawing up a selection of combinations of progressive gears by means of the gear variation means according to the chosen selection.

It shall be observed in FIG. 12 which shall be reused subsequently, that is it possible to plot out the curve of each selection from which the progressivity slope of gears or the corresponding speeds are deduced, both on climbing and going downhill.

If the method described above seems quite appropriate for the large number of reasons mentioned above, it is still necessary to be able to use it simply and reliably: this is the purpose of the device and shall now be described and the possible variants.

FIG. 4 shows a tubular arch 10 forming a handlebar on which a pan 12 is mounted in which a rod assembly 14 is integrated, a cylindrical barrel 16 is provided to cooperate with the rods assembly and a control handle 18 is integral with the barrel, said handle projecting outside the pan and rotating coaxial to the arch around an axis 19.

The pan includes an approximately cylindrical chamber 20 secured to the arch by a double split bracket 22 as shown in FIGS. 5 and 7, a screw 24 ensuring tightening.

A toric type joint 26 ensures upstream imperviousness between the arch 10 and the chamber 20. The chamber 20 is extended towards upstream on the rods assembly side by a rods assembly chamber 28.

The barrel 16 is received rotating inside the chamber 20. This barrel 16 as shown in FIG. 8 includes two tracks 30 and 32, one external and one internal by virtue of the bell shape of said cylindrical barrel 16. The barrel 16 is extended by a control handle 18, more particularly by a body 34 with a round internal section and a triangular outer section for better grasping, this body being covered with a jacket 36 improving comfort and aesthetics (see cross-section of FIG. 6). The internal diameter of the body 34 is identical to the outer diameter of the arch 10 to the nearest operational play.

The chamber 20 is blocked off downstream by a cover 38 fixed by screws 40, more particularly three screws located 120° from one another.

A downstream toric joint 42 ensures imperviousness between the central hole of the cover and the handle body 34.

The rod assembly 14 includes a first 44 and a second cable 46 with a jacket 48, 50 connected to the rear gearshift means of a set of pinions and to front gearshift means of a set of plates. These mechanisms are not shown and may assume any currently known shape or any possible future shape since the rods assembly simultaneously maneuvers two independent cables with a jacket yet without any specific adjustment or regulation devices other than counter-nut jacket stops 52 of a known type.

The cables include crimped heads 54 and 56 which are locked in sliders 58 and 60 mounted sliding in rectilinear translation in slides 62 and 64 fitted inside the rods assembly chamber 28. Each slider is equipped with a roller 66, 68 mounted on a roller bearing, each roller bearing 66, 68 cooperating with the corresponding track 30, 32 of the barrel.

The barrel 16 includes on its front face dummy selection lights 70 more visible in FIG. 8. FIG. 11 shows a section of the lights but with a prepositioning exaggerating the action carried out so as to favor a good gear shifting and a final accurate positioning, the two balls denoted by the phantom line showing the free and prepositioned positions and the ball denoted by the full line showing the final position.

Shown in the pan and more particularly in the rods assembly chamber 28 is a ball lock 72 including a ball 74 and a pressure spring 76 in support on the ball. This ball is provided to cooperate with the elongated slots 70 of the barrel, as explained in the following.

First of all, FIG. 9 shows an embodiment of two geared tracks 30, 32. The first track 30 corresponds to the pinions and the second track 32 to the plates in the case retained.

Twelve combinations out of a possible 24 are shown with 8 pinions and 3 plates.

Note the angular shaft of the two tracks so as to be able to interlace them, which considerably reduces the spatial requirement of the barrel.

The cables are therefore initially at the end of travel on plate A, that is, the smallest, and on pinion 1, that is, the largest. A first rotation of the barrel provokes passage onto pinion 2, the chain remaining on plate A, then via successive rotation on pinion 3 and pinion 4, which corresponds to A1, A2, A3, A4.

The plate used next is B so that the chain gears from the plate A to B as the cable 46 is drawn by the cursor 68 which moves in the track 32 whereas at the same time the track 30 bends so as to tighten the cable 44, which brings the chain back onto pinion 3 so as to obtain the fifth combination, namely B3.

The subsequent rotation leads to pinions 4, 5 and 6 so as to obtain the combinations B4, B5 and B6. These are the sixth, seventh and eighth combinations.

An additional rotation of the handle and the barrel provokes passage onto the plate C with a return onto pinion 5 so as to obtain the ninth combination retained, C5.

Successive rotations then shall permit changes of the pinions 6, 7 and 8 giving the final combinations C6, C7 and C8, that is the tenth, eleventh and twelfth combinations selected according to the method.

Two stops are also provided for suppressing the first and final positions depending on whether there are 10 or 11 gears selected from the possible 12 so as to avoid any shift of gear as the distance to the outside of the extreme positions is larger, especially in the case of 8 pinions.

All the positions are indexed by the ball 74. This indexing even allows a completely free high-performing gear shifting as the prepositioning (see FIG. 11) allows a slight movement further which provokes an extremely fast change followed by a slight return backwards and by the precise positioning of the ball in the pan, this constituting an ideal indexing in which the chain is at the best possible plate/pinion alignment for the selected combination.

When the user wishes to reduce gear, it merely suffices for him to turn the handle in an opposite direction by the number of notches required.

Thus, simplicity of operation and use is confirmed, such as with a motorcycle accelerator handle.

Depending on the gears retained, it is also possible to almost instantly modify the selection by changing the barrel.

To this end, the three screws 40 are removed so as to be able to open the cover 38. The barrel 16 with its handle 34 are removed by translation on the arch. It is simply essential to take the precaution of placing the sliders 58 and 60 in correspondence with inside recesses shown diagrammatically by the broken line in FIG. 10 for passage of the rollers which constitute the inlets of the tracks.

The placing of a new barrel with tracks corresponding to new gear combinations is effected via inverting the sequence of the operations described above.

Of course, the fixing of the cover may be fast fixing more adapted to such a change able to be effected by an operator with clips or a quarter turn of a screw thread produced with the cover instead of independent screws.

Tests have shown that a single control as described above takes up less space, has highly operational flexibility and is extremely simple resulting systematically in a good choice for the adequate gear.

Any device in aiding gear selection, especially a window 15 as shown on the pan 12 in FIG. 4, is acceptable.

There is another important characteristic to render the device of the invention fully complete. This characteristic resides in the possibility of changing the gears much faster than when climbing or vice versa.

In fact, arriving at the foot of an obstacle, clearing a muddy passage, steep rise or sand for example, the user may assess a return of the gear 12 to the gear 5 as quickly as possible.

Figures 13A, 13B, 13C:
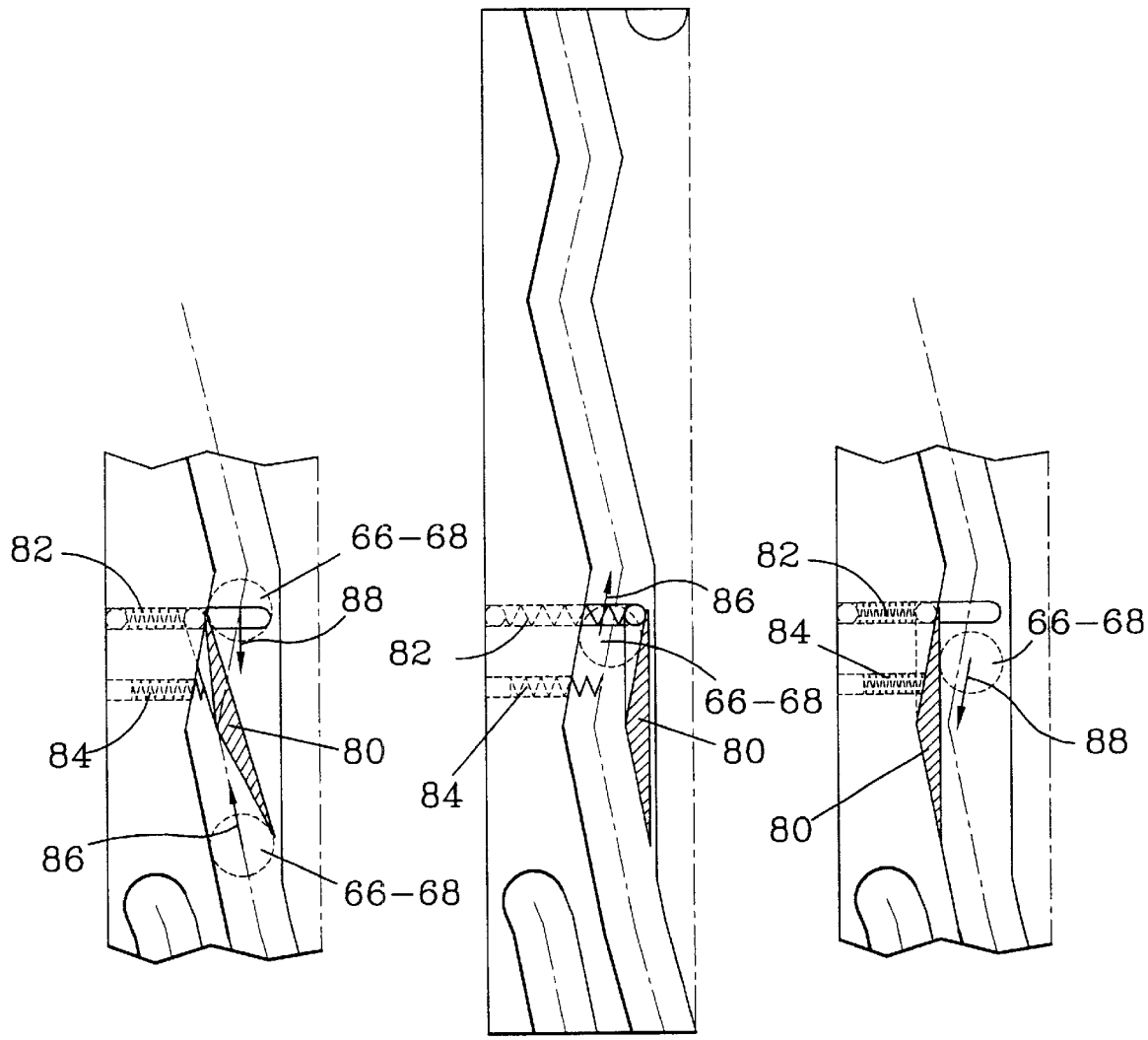
FIGS. 13A, 13B and 13C represent this shunting and its functioning.

The present invention also provides as a complement a shunting shown in FIG. 13A. This shunting includes a blade 80 with a double slope and a base forming a triangle, as well as two springs 82 and 84. The spring 82 is inserted between the barrel and one of the points operating on traction, and the spring 84 is inserted on the slope corresponding to this point operating on compression so as to make the blade pivot around this point.

Functioning is indicated with reference to the additional FIGS. 13B and 13C.

The ball roller 66 or 68 of the slider, when moving in relative translation by rolling of said roller with respect to the barrel along the arrow 86 takes support on the first slope of the blade 80 and then rolling onto the second slope, moves the point downstream and at the same time stretches the spring 82. The roller then follows the given profile of the track which includes a widening at the right of the shunting.

The position then reached is shown on FIG. 13B.

On return along the arrow 88 with the spring 82 having returned the downstream point of the blade 80, the roller takes support on the base of the blade, which shunts the stage at the right of the switching making the chain "jump" by one or two pinions or by one plate.

The spring 84 is slightly compressed in the passage so as to then bring back the blade 80 into the position shown on FIG. 13A.

A variant may also be possible which consists of placing the roller in support on one of the sides of the track on climbing and on the opposite side of this same track on going downhill, the two sides not having an identical profile.

Figure 14:
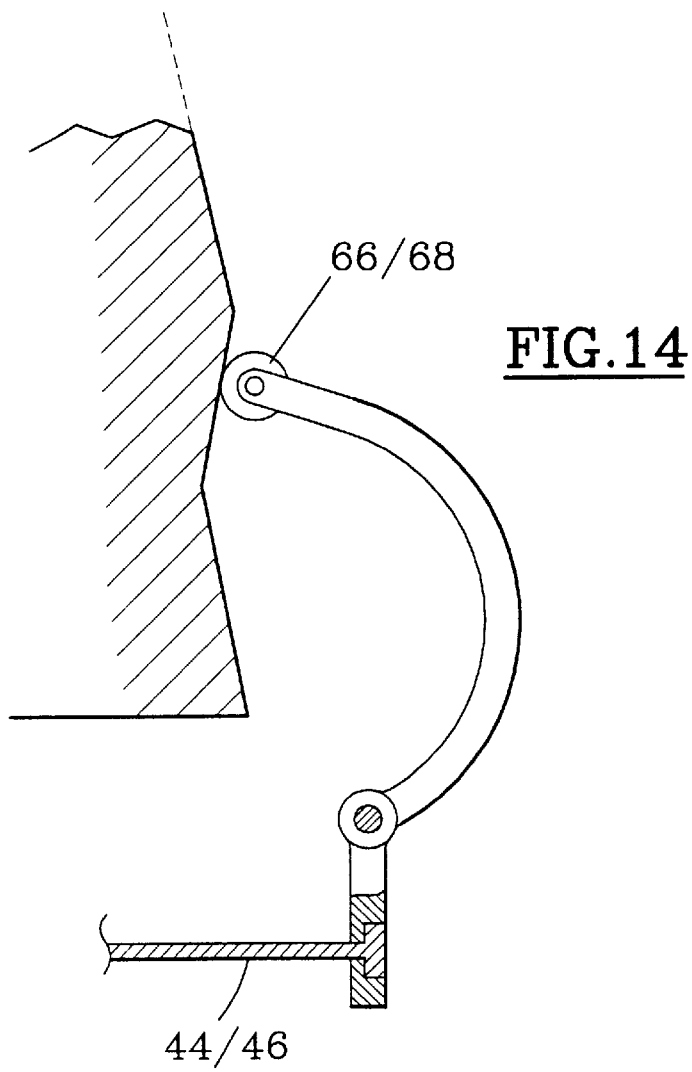
FIG. 14 is a diagrammatic view of a reversing lever.

It is to be noted that if the maneuver of one of the cursors is inverted, as in the diagrammatic variant of FIG. 14, it is possible with a lever to gain further space available as the tracks 30 and 32 shall diverge, whereas in this instance they could converge.

Figure 15:
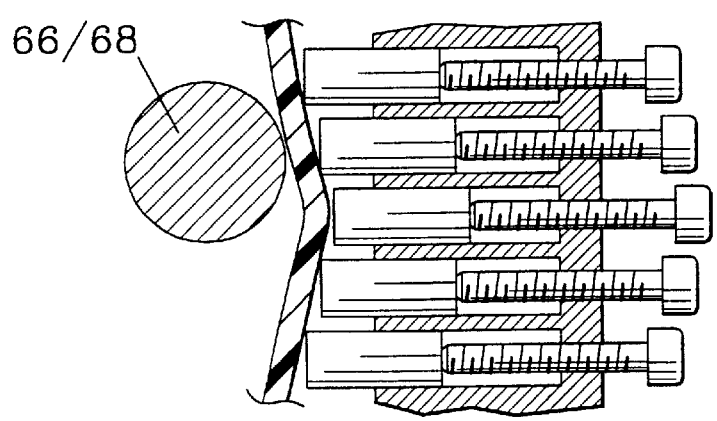
FIG. 15 represents a variant with a modular cam.

FIG. 15 shows a variant with a track cut into sections. In fact, in this case, the rollers come in support on tracks which include elementary segments in the form of screws and able to be moved in translation so as make the track, including a membrane or set of adjustable sliding segments, conform to the desired profile. This variant may be particularly advantageous for competitive riders.

According to the invention, a highly important improvement has been provided for users. In fact, the gearshift means, as explained earlier in the text, generally include a yoke with a recall spring. This unit is diagrammatically shown in FIG. 17, the yoke bearing the reference 90, the mobile arm 92, the housing 94, the spring 96 and the plates or pinions 98. The other references linked to the invention have the same numbers as in the preceding description.

With known types of gearshift means, by means of gear reduction levers, the user needs to exert significant force to compress the spring 96 when he wishes to move the yoke in a direction so that the recall energy accumulated by the spring ensures the return of the yoke as soon as the user releases a certain length of cable by moving the lever concerned in an opposite direction.

Figure 16:
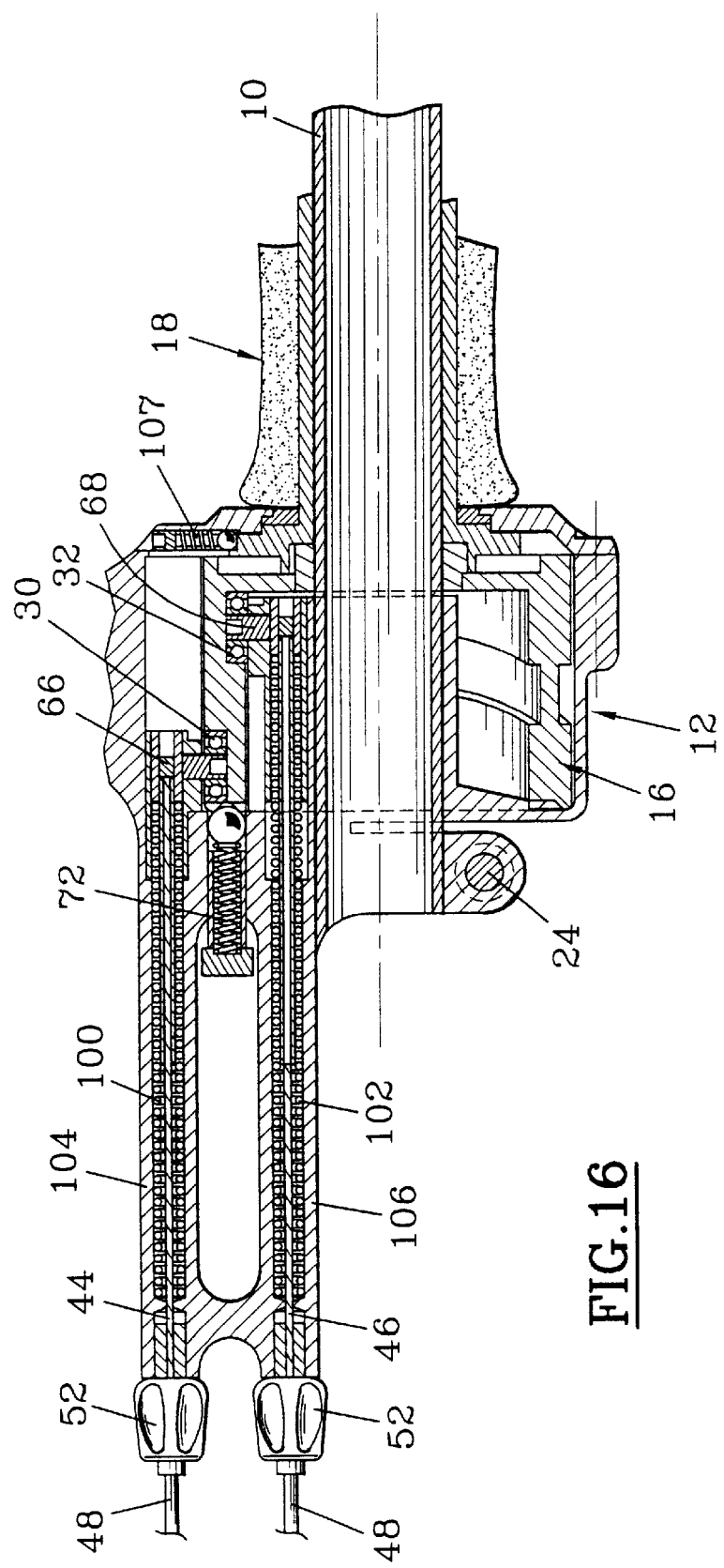
FIG. 16 represents an extremely important improvement of the invention which has just been described, especially for user comfort.

In the case of the present invention, with reference to FIG. 16 which shows an embodiment differing slightly from the previous one as regards the barrel, the sliders 58 and 60 integral with cables exert significant forces on the rollers 66 and 68, forces which may render the rotational movements difficult to carry out or at least which does not afford the flexibility and operational smoothness which would be desirable for a user.

As the movements of the barrel are indexed, the significant improvement as regards user comfort consists of placing for each cable a long, thin small diameter compensation spring 100, 102 so that the spires meet when the spring is fully compressed and almost meeting when the spring is slightly slackened, having regard to the small amount of travel of the sliders.

It is to be noted that the total force of each of the springs needs to be approximately identical to that of the recall means of the corresponding gearshift means to provoke an equilibrium.

As shown in FIG. 16, each spring is placed in a housing 104, 106 in the elongation of the pan 12 and produced with the latter.

Figure 17:
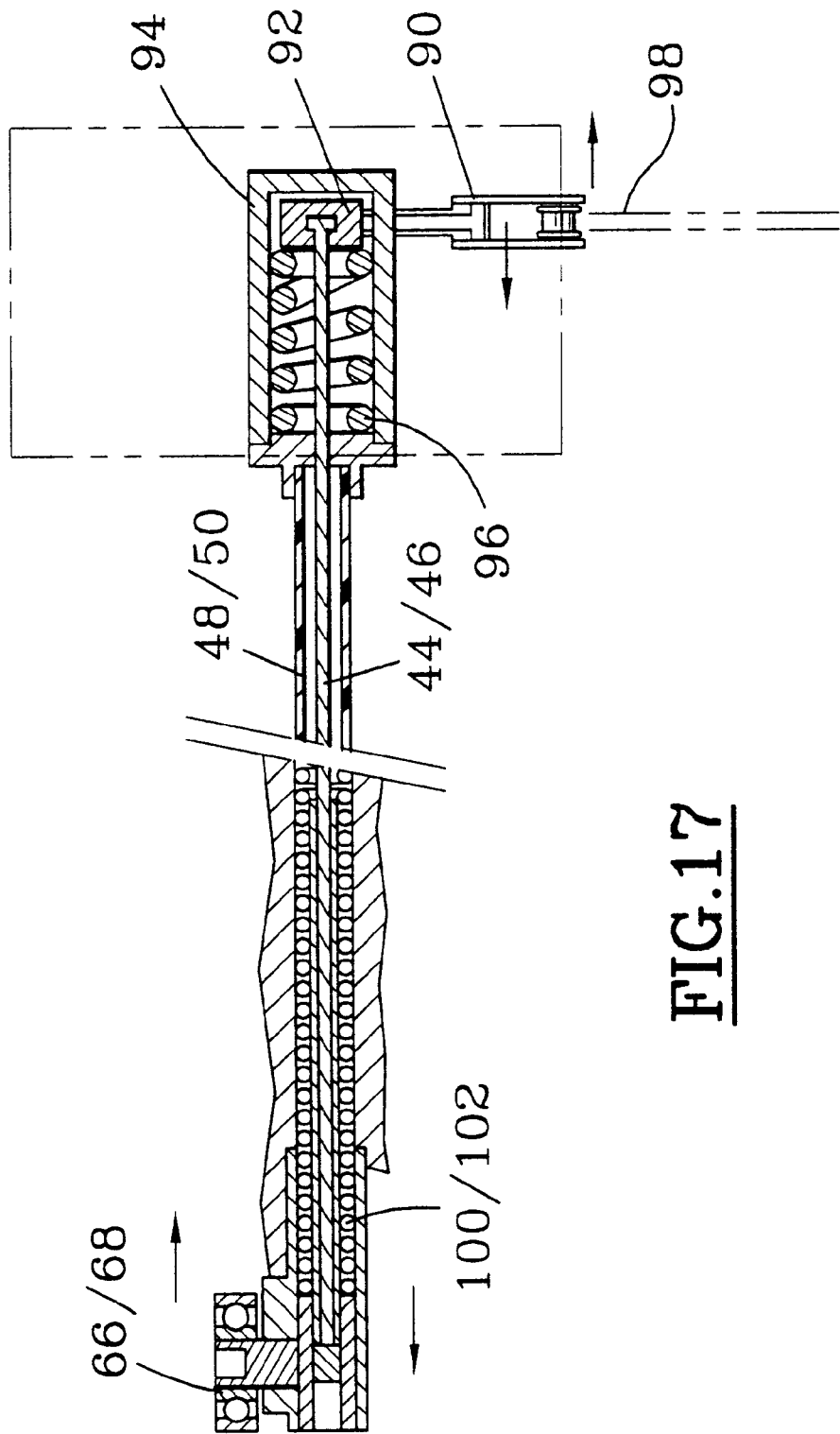
FIG. 17 shows a diagrammatic representation of the functioning of this improvement.

This figure shows a simplified mounting which clearly shows the advantage of the compensation spring 100, 102 in FIG. 17.

When the user maneuvers the handle in a particular direction moving the slider in a particular direction and when it exerts a force to compress the recall spring 96 of the corresponding gearshift means, the pre-compression of the corresponding compensation spring 100 or 102 is released, which accordingly reduces the force to be exerted by the user. A ball stop 107 also allows for adjustment of the stiffness of the handle if the maneuver proves to be too flexible, while ensuring an indexing force when housing is provided to house this ball.

Conversely, when the user maneuvers the handle in the other direction moving the slider relatively in the other direction and when he exerts a force to compress the corresponding compensation spring 100 or 102, the energy stored in the recall spring 96 of the corresponding gearshift means is opposed and this force is deducted from the force to be provided by the user.

This disposition results in an extremely smooth mechanism without posing any problem concerning guidance and precision as the rollers are guided in ramps, the edges of these ramps having precise dimensions with respect to the dimensions of the rollers, which limits the clearances to the only clearances required.

Moreover, as the forces to be exerted are therefore compensated, this offers advantageous perspectives to further improve the disposition of the device of the invention.

In fact, the slopes of the tracks in relation to the rollers may be much larger without disturbing the maneuver of the handle by the user. Thus, it is possible to reduce the length of the tracks and thus reduce the angular travel of the handle. The gaps may be regularly distributed angularly which again simplifies the disposition of the invention.

Figure 18A:
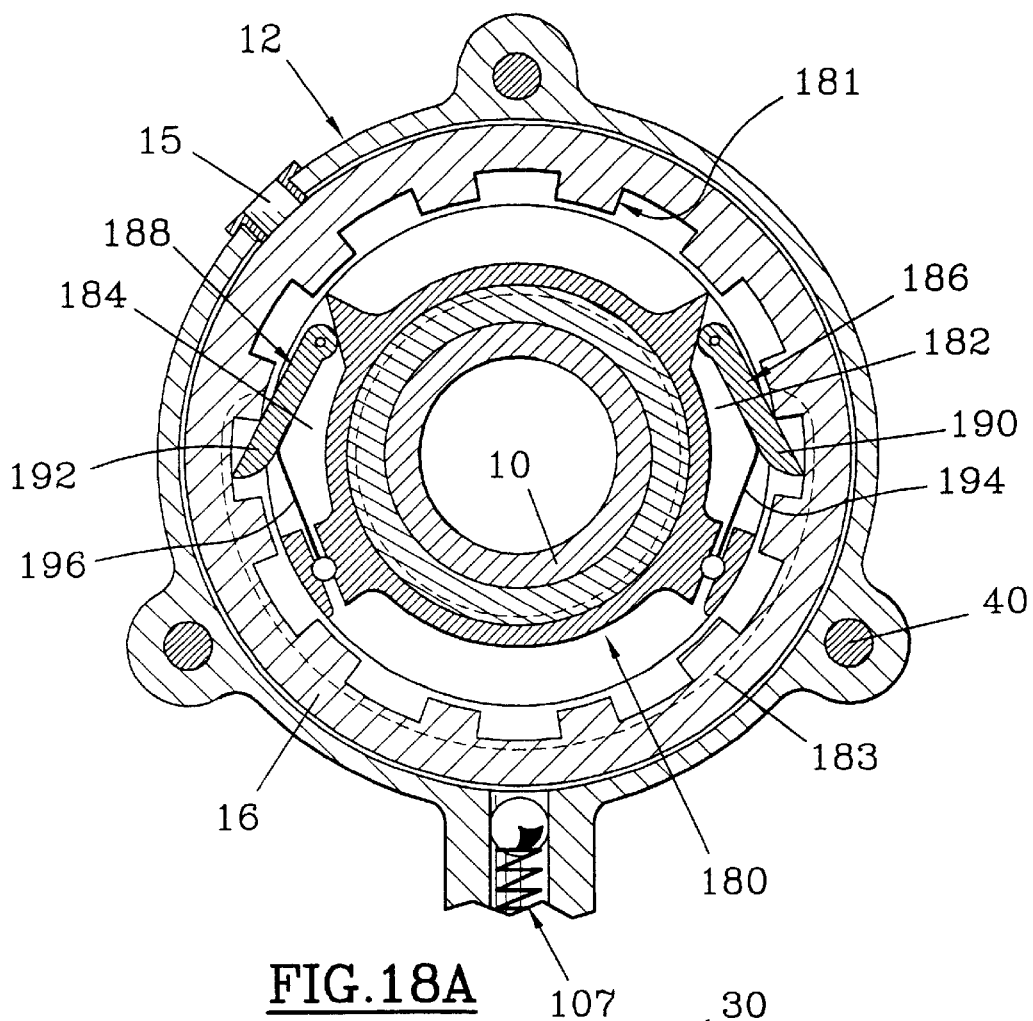
FIGS. 18A and 18B show a ratchet mounting for limiting the angular travel, FIG. 18B showing more particularly the barrel.
Figure 18B:
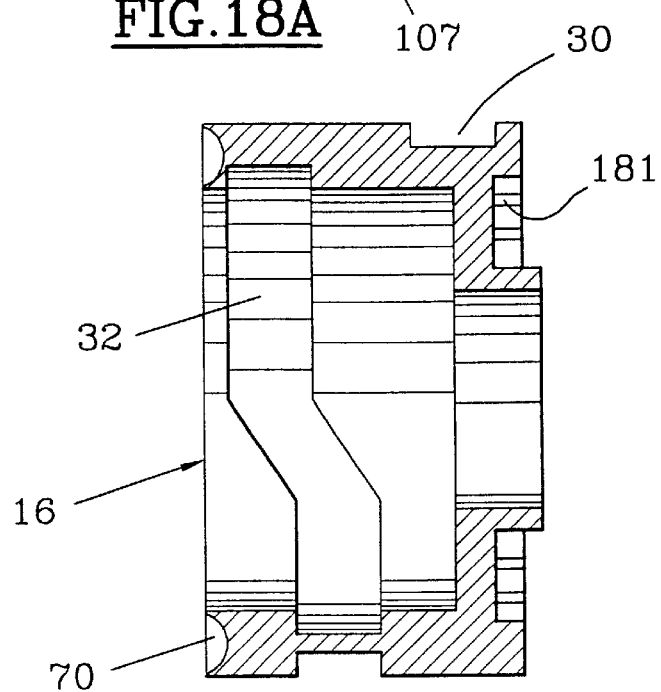

FIGS. 18A and 18B diagrammatically show an extremely important improvement with a ratchet mounting able to be adapted to the variants mentioned previously.

It is proper to leave the barrel 16 free in rotation which is no longer integral with the handle 18.

The barrel is fitted with notches 181 on an annular zone of its internal surface.

On the other hand, the handle 18 is extended inside the barrel by a bell 180 coaxial to the barrel 16 inside.

This bell includes two housings 182, 184 with a ratchet 186, 188 being disposed in each housing.

These ratchets each include a pawl 190, 192 articulated in the housing which bears it and a recall spring 194, 196 which makes this pawl project so that it is able to cooperate with the notches fitted in the barrel.

Of course, the pawls are disposed so that a pawl hooks the notches in a rotational direction of the handle, whereas the other is retracted and vice versa. This is obtained by a track 183 which forms a stop authorizing an angularly controlled movement which makes it possible to limit the clearance to one notch or several notches in the direction of the rise or fall of the gears.

This is why the angular clearance of a man's wrist is larger to reduce the gears than to raise them up. It is also possible to bring back the handle into a neutral position, that is, as shown in FIG. 18A, namely all the notches on climbing, and bring back the handle into a neutral position, that is every first, second, third or fourth successive notches on going downhill.

This makes it possible to rotate the barrel in either direction according to requirements.

Thus, the advantages of this improvement are numerous since the user can move from one or several gears on climbing and when going downhill.

Moreover, in conjunction with the preceding compensation improvement which reduces travel, user comfort is one hundred per cent improved.

It is to be noted that the notches in a neutral position receive ratchets at their middle point, the ball stop 107 therefore positioning them. This offers an advantage as the ratchets only engage the notches when the ball stop 107 is unlocked, which avoids the user having to exert two forces at the same time. These forces are successive, which further contributes in operational smoothness.

The advantages offered by the method and device of the invention may be summed up as being significant and different from the prior art, especially regarding bicycles, a known type of transportation vehicle for such a long time:

Suppression of the need to select pinions and plates with solely a choice of increasing or reducing gear according to requirements and the capacities of the user, like a gas handle of a motorcycle, while retaining good chain alignment;

Flexibility in maneuvering a single handle with display of sole information with disposition of this single handle for a right-handed or left-handed person;

Increased reliability by an extremely limited number of parts which may be made of a light alloy or a suitably-adapted plastic material.

Possibility of almost instantaneous changing of the selection of gears by changing the barrel;

Adaptation to bicycles in particular upon initial manufacture but also to existing bicycles without modifying these bicycles;

Free and precise gear shifting by means of exaggerating the movement beyond the position corresponding to the gear retained and return to a perfect position corresponding to the best chain alignment for the selected gear.

What is claimed is:

1. A method of selecting a set of p gear ratios from among m×n gear ratios available in a chain transmission having a drive train with n driving plates and m driven pinions, p being an integer less than m×n, the method comprising the steps of:

suppressing the gear ratios from among the m×n gear ratios which align a chain connecting the plates and pinions outside a predetermined alignment range;

selecting p of the gear ratios from among the unsuppressed m×n gear ratios, the p selected gear ratios having gear ratios which are incrementally increasing, wherein, for at least one of the p selected gear ratios, both the plate and the pinion associated with the one gear ratio are different from both of the respective plate and pinion associated with an immediately adjacent one of the p selected gear ratios;

suppressing remaining ones of the m×n gear ratios which were not the p selected gear ratios; and providing a single rotatable handle for selectively choosing and engaging each of the p selected gear ratios, the single handle being incapable of selecting and engaging the suppressed gear ratios.

2. The method of claim 1, wherein the p selected gear ratios are regularly distributed between a highest and a lowest of the m×n gear ratios.

3. The method of claim 1, wherein the chain transmission is for a bicycle with a steering bar, and further comprising the step of providing the single rotatable handle on a distal end of the steering bar where the single handle is also for gripping and directing the steering bar.

4. The method of claim 3, wherein the single rotatable handle is cylindrical and rotates about a longitudinal axis of the steering bar to selectively choose and engage each of the p selected gear ratios while the handle is being gripped to direct the steering bar.

5. The method of claim 1, further comprising the step of providing a compensating force at the single handle to so that a force needed to rotate the single handle is the same for all of the selectively chosen gear ratios.

6. A method of selecting a gear ratio for a chain transmission having a drive train with n driving plates and m driven pinions, the chain transmission providing p sequentially increasing gear ratios from among the possible m×n gear ratios, p being an integer less than m×n, the method comprising the steps of:

rotating a selection handle to deselect and disengage a first one of the p gear ratios and to select and engage a second one of the p gear ratios that is sequentially next to the first gear ratio, wherein both the plate and the pinion associated with the first gear ratio are different from both of the respective plate and pinion associated with the second gear ratio; and rotating the selection handle to select and engage a third one of the p gear ratios that is sequentially next to one of the first and second gear ratios, wherein only one of the plate and the pinion associated with the third gear ratio is different from the respective plate and pinion associated with the respective first or second gear ratio, wherein the force needed to rotate the selection handle is the same when selecting and engaging the second gear ratio and when selecting and engaging the third gear ratio.

7. A method of selecting a set of p gear ratios from among m×n gear ratios available in a chain transmission for a bicycle having a steering bar for directing a front wheel of the bicycle, the chain transmission having a drive train with n driving plates and m driven pinions, p being an integer less than m×n, the method comprising the steps of:

suppressing the gear ratios from among the m×n gear ratios which align a chain connecting the plates and pinions outside a predetermined alignment range;

selecting p of the gear ratios from among the unsuppressed m×n gear ratios, the p selected gear ratios having gear ratios which are incrementally increasing, wherein, for at least one of the p selected gear ratios, both the plate and the pinion associated with the one gear ratio are different from both of the respective plate and pinion associated with an immediately adjacent one of the p selected gear ratios;

suppressing remaining ones of the m×n gear ratios which were not the p selected gear ratios; and providing a cylindrical handle at a distal end of the steering bar that is arranged and constructed to be gripped by a rider to direct the steering bar and to rotate about a longitudinal axis of the steering bar to selectively choose and engage each of the p selected gear ratios while the rider grips and directs the steering bar at the handle and rotates the handle, the handle being incapable of selecting and engaging the suppressed gear ratios.

* * * * *